United States Patent [19]

Biber et al.

[11] Patent Number: 5,170,394
[45] Date of Patent: Dec. 8, 1992

[54] HOST NETWORK COMMUNICATION WITH TRANSPARENT CONNECTION DEVICES

[75] Inventors: Jeffrey A. Biber, Sterling, Va.; Zon-Hong Hsieh, Potomac, Md.

[73] Assignee: Sprint International Communications Corp., Reston, Va.

[21] Appl. No.: 630,247

[22] Filed: Dec. 19, 1990

[51] Int. Cl.[5] .................. H04L 12/56; H04J 3/24
[52] U.S. Cl. ..................... 370/94.1; 370/85.8; 340/825.08
[58] Field of Search ............. 370/94.1, 60, 85.8, 370/95.2, 94.2, 94.3; 340/825.08; 371/32, 33

[56] References Cited

U.S. PATENT DOCUMENTS

| | | | |
|---|---|---|---|
| 4,755,992 | 7/1988 | Albal | 370/94.1 |
| 4,951,278 | 8/1990 | Biber et al. | 370/94.1 |
| 4,975,905 | 12/1990 | Mann et al. | 370/94.1 |
| 5,023,604 | 6/1991 | Takase et al. | 370/94.1 |

Primary Examiner—Douglas W. Olms
Assistant Examiner—H. Kizou
Attorney, Agent, or Firm—Leitner, Greene & Christensen

[57] ABSTRACT

A packet switched network has a system for providing an end-to-end connection for a communication or data transfer session between a host processor and a transparent connection device, which may be an unattended device, both utilizing a 3270 protocol. A terminal PAD is responsive to positive dataset signals on the associated line for the device indicating desire to establish communication by the device, irrespective of the absence of polling of the device by the host or by the terminal PAD, to transmit a call request packet through the network to a host PAD operatively associated with the host. The host PAD is responsive to the call request subsequent to a poll from the host to transmit call accept and circuit enable packets through the network to the terminal PAD. The latter then commences polling of the device to evoke information and data messages from the device for end-to-end communication with the host in the data transfer state. This procedure is followed only on start-up of the system, including start-up following a virtual circuit or other failure in the network so that the virtual circuit is automatically re-established even for unattended devices. At all other times after the start-up, communication is handled by local polling.

13 Claims, 13 Drawing Sheets

HOST NETWORK COMMUNICATION WITH TRANSPARENT CONNECTION DEVICES

BACKGROUND OF THE INVENTION

The present invention relates generally to packet switched digital telecommunication networks, and more particularly to such a network having improved systems for establishing connections for end-to-end communication between a host processor and remote transparent connection devices.

In 3270-type applications, polling takes place in which the Host computer or processor (Host) is coupled to a Host PAD (packet assembler/disassembler) that emulates the drops of various Control Units (CUs) and associated devices such as printers, displays or other terminal devices. As with most protocols, the polls are not transmitted through the network. Similarly, a Terminal PAD interacts with the CUs and their respective devices and conducts its polling with them locally.

In present-day 3270 applications, the process of setting up a connection to the Host calls for the terminal PAD to poll its CUs/devices and receive a special character or set of characters from the device to initiate the call. This requires that a user be present at the device to initiate the call. Even if the Terminal PAD has the address of the destination to which the call connection is to be made, it will not set up the call until the user's initiation.

In some applications employing the IBM 3270 system protocol, such as ATMs (automatic teller machines), there is no user per se—only an individual who enters a card to set up a connection with the Host. It would be desirable to set up the connection without requiring entry of a specific character by an operator. Also, when the terminal PAD polls the 3270 ATM, the ATM goes in service and recognizes the presence of a Host so that a card may then be inserted. If a call cannot be established to the Host, for whatever reason, the desired transaction cannot be completed by the customer. The user has no indication that the system is out of service, nor does the ATM recognize that a failure has occurred. It "sees" the poll and therefore assumes the Host is present and available. Here again, it would be desirable to have some technique to indicate that this is not the case.

It is therefore a principal object of the present invention to provide improvements in establishing end-to-end communication between a Host and devices employing 3270 protocol in an X.25 packet switched network.

It is another broad object of the present invention to provide apparatus and processes for establishing "transparent" connections as a preliminary to communication between devices at opposite ends of a packet switched network (PSN).

SUMMARY OF THE INVENTION

According to the invention, the Call Request packet employed in the call set-up sequence of the connection in an X.25 protocol for a packet switched network proceeds upon detection of positive dataset signals (DSSs) which indicate a completed physical connection. (The set of DSSs which indicate a completed physical connection may vary depending upon the configuration environment). At that point, a transparent connection is provided between a Host PAD and a Terminal PAD. The initial connection is referred to as a transparent connection because when a connection is first sought, the terminal device normally is not polled until a poll is received from the Host. Similarly, on the Host side a poll is not answered until an answer is received from the terminal device. This presents a dilemma in that the transaction must be initiated by someone, that is, by the Host or the terminal device.

According to the invention, the transparent connection aspect is provided in part by the establishment of a protocol that dictates the sending of a Call Request (CR) packet when positive DSSs are detected by the Terminal PAD. There is no initial polling of the terminal device, but the CR packet is forwarded by the terminal PAD through the network to the Host PAD. If the Host is polling, then a Call Accept (CA) packet is sent by the Host PAD through the network to the Terminal PAD, along with a DQ (Circuit Enable: CE) packet to establish a virtual circuit (VC).

This conforms to a Level 4 protocol for 3270 DSP. Receipt of a CE packet is recognized by the Terminal PAD as a poll, and the CU transparent connection device is then polled. This initiates a response from the CU for the particular device being polled, and a DQ (Status: DE) packet is forwarded by the Terminal PAD to the Host PAD and on to the Host, which the Host recognizes as an end to end response. Correspondingly, the CU device senses a poll as an end-to-end poll. This sequence of events occurs only on start-up. Thereafter, everything concerning the polls is handled locally.

The algorithm declares that if end-to-end poll and response are encountered on start-up, set up the call; thereafter, use local polling and response at the two ends. Polling after connection is set up allows the terminal device (CU device or source terminal) to send data to the Host on request. This technique is useful for any unattended 3270 protocol operation.

Therefore, it is a more specific object of the present invention to provide transparent connections on start-up and existence of certain conditions in the network.

Still another object is to provide a PSN in which a single transparent connection is configured with each CU to provide an accurate reflection to the local device of end-to-end communication with the remote device through the network.

BRIEF DESCRIPTION OF THE DRAWINGS

The above and still further objects, features, aspects and attendant advantages of the present invention will become apparent from a consideration of the following detailed description of a presently preferred embodiment thereof, taken in conjunction with the accompanying drawings, in which.

DESCRIPTION OF THE PRESENTLY PREFERRED EMBODIMENT AND PROCESS

The transparent connection scheme of the present invention is effective to assure an end-to-end connection or to provide the reason for failure thereof on start-up of a transaction between a Host and one or more devices contained in a CU group. When the system first comes up, the device is not polled until a poll is received from the Host. Also, the Host PAD side will not answer the poll until an answer is received from the CU device. When positive dataset signals are detected, a CR packet is sent by the Terminal PAD to the Host PAD. In response to a poll from the Host after receiving the CR packet, the Host PAD sends a CA packet and a CE packet to the terminal PAD.

The CE packet falls within display system protocol (DSP), conforming to standard Level 4 protocol for 3270 systems. When the CE packet is received, it is recognized as a poll from the Host, requiring a poll of the CU device. When the CU responds to this poll, a status message is sent back to the Host, which constitutes a response to the CE packet. The Host recognizes this as an end-to-end response. Similarly, when the CU device is polled, it recognizes that as an end-to-end poll. This entire sequence occurs only on system start-up. After initialization, everything else involving polling is handled locally, in conformance with the requirement that polls are not transmitted through the network.

If the virtual circuit fails after start-up, polling is stopped. In the case of an ATM as the terminal device, the ATM then recognizes that the Host is no longer present. Polling is performed after the connection is set up because the only way a terminal can send data to the Host is if the Host asks the terminal for the data. Hence, once the call is set up, the Terminal PAD proceeds through the list of what responses to request of and give to the Host, and sends the data through.

The process of the present invention is useful for any unattended 3270 operation, in the sense that an operator is not present at the machine throughout a start-up phase to initiate and respond to every request. Such a machine may, for example, be an ATM, a printer or some other device at which an operator is not usually present. In conventional 3270 applications, if, for example, a printer were being used to complete a lengthy print job with no operator present, and a VC failure were to occur, the printer would not restart automatically because no one is available to punch the key necessary to reestablish the connection. Consequently, the job would be lost.

It should be noted that although some ATMs, for example, are programmed to send a character for start-up when the machine is turned on, they are not effective to automatically re-establish the connection in the event of VC failure, because the programming is available only on start-up.

In essence, then, the transparent connection process of the present invention provides connection of a 3270 device which may, for example, be a display or a printer, through a packet switched network with no user intervention. Communication between the 3270 Host processor and the remote 3270 device reflects end-to-end communication through the network. The principal functions of the transparent connection system according to the invention include the following:

First, automatic establishment of a virtual circuit for the 3270 device is initiated on detection of positive dataset signals (DTR/DSR) on the associated line, without the requirement of link-level communication with an attached control unit.

Second, a CU may contain multiple transparent connection devices, and the establishment of communication with each (that is, the start of polling from the Terminal PAD) reflects both establishment of the VC through the network, and link-level communication capability with the remote Host (that is, receipt of a poll from the Host, although certain conditions, noted below, must be met before the Host PAD will respond to the poll).

Third, establishment of link-level communication with the Host (that is, response to a poll on behalf of the attached CU) reflects both establishment of the VC through the network, and establishment of link-level communication between the Terminal PAD and the 3270 device. These are the conditions referred to immediately above that must be met for Host PAD response to the poll. Such capability is applicable only to CU configurations consisting of a single device. For a multiple device CU, establishment of link-level communication with the Host takes place upon establishment of a VC to the first device and completion of the initial DSP DQ (Circuit Enable: CE) packet exchange.

Fourth, The user interface is totally disabled for transparent connection devices, including suppression of offline menu, online menu, and all call progress messages.

With respect to multiple device CUs, the Terminal PAD commences specific polling of the CU cluster for each transparent connection device when the latter's VC is established and the corresponding CE packet is received. General polling replaces specific polling if VCs are established to all transparent connection devices on the CU. During specific polling, only that device whose VC is established is polled in each polling cycle. A polling cycle consists of the Terminal PAD completing polls from the first CU to the last CU on a 3270 communication line. Accordingly, if, for example, two devices on a CU cluster have their VCs established, two polling cycles are required for the Terminal PAD to poll the two devices (one per device).

A CU configuration of multiple devices may be configured through table building as a mix of transparent connection, attended autoconnect, and user connect, but the X.25 VCs for all of the transparent connection devices must be established before connection capability is provided for the other devices. Also, if any transparent connection VC is cleared, the Terminal PAD ceases polling the non-transparent connection devices, with resumption of polling occurring only on re-establishment of the transparent connection VC(s). Similarly, the Host PAD is suppressed from responding to any Host poll for a CU configuration having such mixed logical devices, until the first X.25 VC is established for a transparent connection device among them and the DQ (Status) packet for such device is received (that is, the first sense/status packet in response to its CE packet). Preferably, therefore, the CU cluster with multiple devices is limited to either transparent connection devices or non-transparent connection devices, and does not include a mix of the two types.

In the preferred embodiment, the Terminal PAD will not retry establishing VCs to transparent connection devices until the configurable autoconnect retry interval (for example, about 30 seconds) has elapsed, to prevent rapid successive retries during a Host or network failure. However, unlimited retries for transparent connection are performed until either success is achieved or the dataset signals of the associated line are dropped.

The BSC 3270 Terminal PAD initiates establishment of the VC, without any requirement of link-level communication with the device before doing so, on detection of positive dataset signals (DTR/DSR) when the device is configured for transparent connection. If this initial attempt is unsuccessful, the Terminal PAD enters the autoconnect retry process, waits for the time-out of the autoconnect retry interval before a re-attempt, and continues the retry process until either the VC is successfully established or the dataset signals on the associated line are dropped. In the preferred embodiment, the 5 autoconnect retry count, and three autoconnect retry intervals, viz, normal, slow and very slow, are selectively configurable. Upon establishment of the VC, the Terminal PAD initiates link-level communication with the CU and polls the device associated with the established VC.

A single transparent connection is configured with each device in the CU group to provide an accurate reflection to the local device of end-to-end communication with the remote device through the network. A VC for the device is established automatically through the network on detection of positive dataset signals on the associated line of the attached CU. Such establishment of the VC also depends on the link-level communication capability with the remote Host. That is, the Host PAD receives polls from the Host, and on receipt of such a poll after receiving a call request packet, the Host PAD transmits a call accept packet to the Terminal PAD to complete the establishment of the VC.

If the VC is established, the Host PAD sends a CE packet to the Terminal PAD. Link-level communication takes place between the Terminal PAD and the CU cluster upon receipt of the CE packet. The Terminal PAD then commences polling the CU, and awaits a response. Depending on the response, the Terminal PAD forwards an appropriate DQ (Status) packet (including Sense/Status indication from the CU) to the Host PAD, which passes it to the Host, and link-level communication then begins in that the Host PAD starts responding to the Host polls. In this way, establishment of end-to-end communication is completed.

Figure 1:
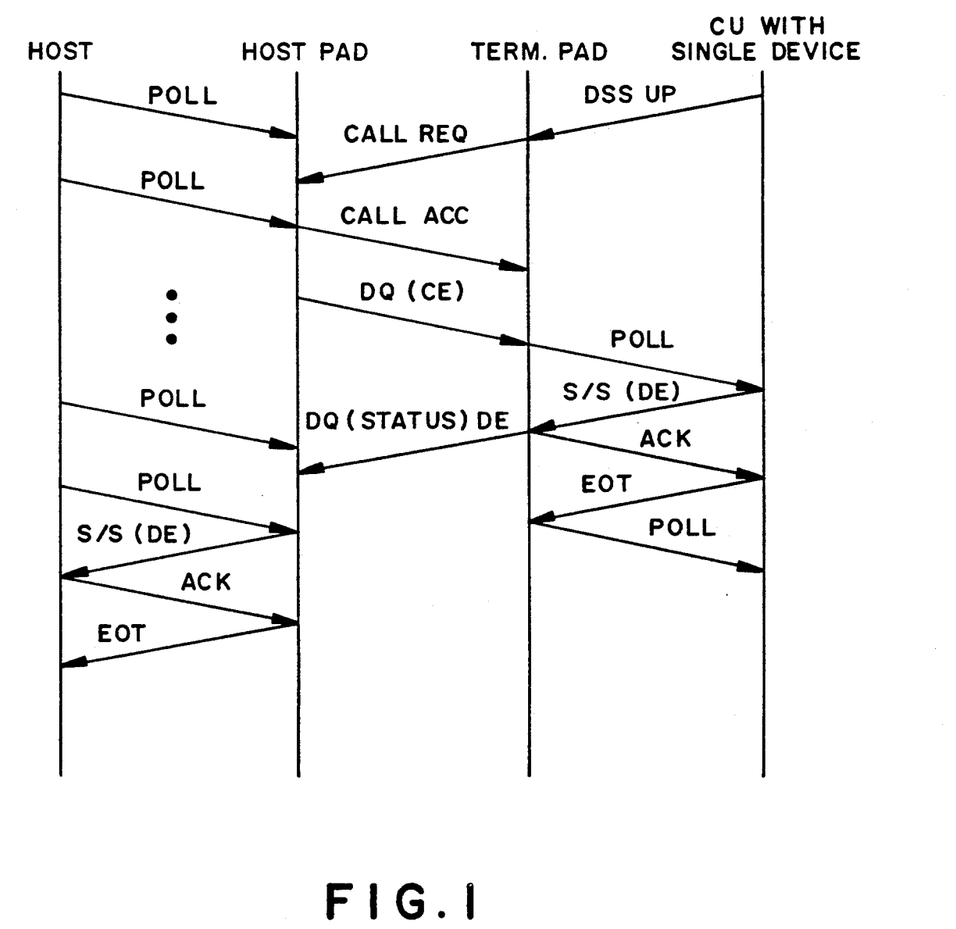
FIGS. 1 through 13 inclusive are sequence diagrams illustrating the process of establishment of transparent connections between a Host and devices contained in CU groups in an X.25 packet switched network according to a presently preferred embodiment and process of the invention.

The manner of establishment of the VC and end-to-end communication between the device and the Host for a single transparent connection device per CU configuration, in which the CU responds with a Sense/Status (S/S) message containing device ready (specifically, DE without IR), is depicted in the sequence diagram of FIG. 1. (DE and IR are IBM-defined S/S indicators, DE equating to Device End indicating device is up, and IR equating to intervention required indicating device is down).

Referring to FIG. 1, the Host periodically polls the Host PAD. At some point, the Terminal PAD detects positive DSSs on the associated line and responds by issuing a CR packet to the Host PAD. Upon the very next poll from the Host to the Host PAD, the latter generates a CA packet to the Terminal PAD and a VC is established. The Host PAD sends a DQ (CE) packet to the Terminal PAD, which then polls the CU. The CU responds with an S/S message indicating the device is up, and this status is included in the Terminal PAD's DQ (Status) packet to the Host PAD. At the same time, the Terminal PAD acknowledges receipt of the S/S message to the CU. The Host PAD passes the S/S message on to the Host to establish link-level communication therebetween. An EOT transitions both the Host and Terminal Pad to a normal data transfer state.

Figure 2:
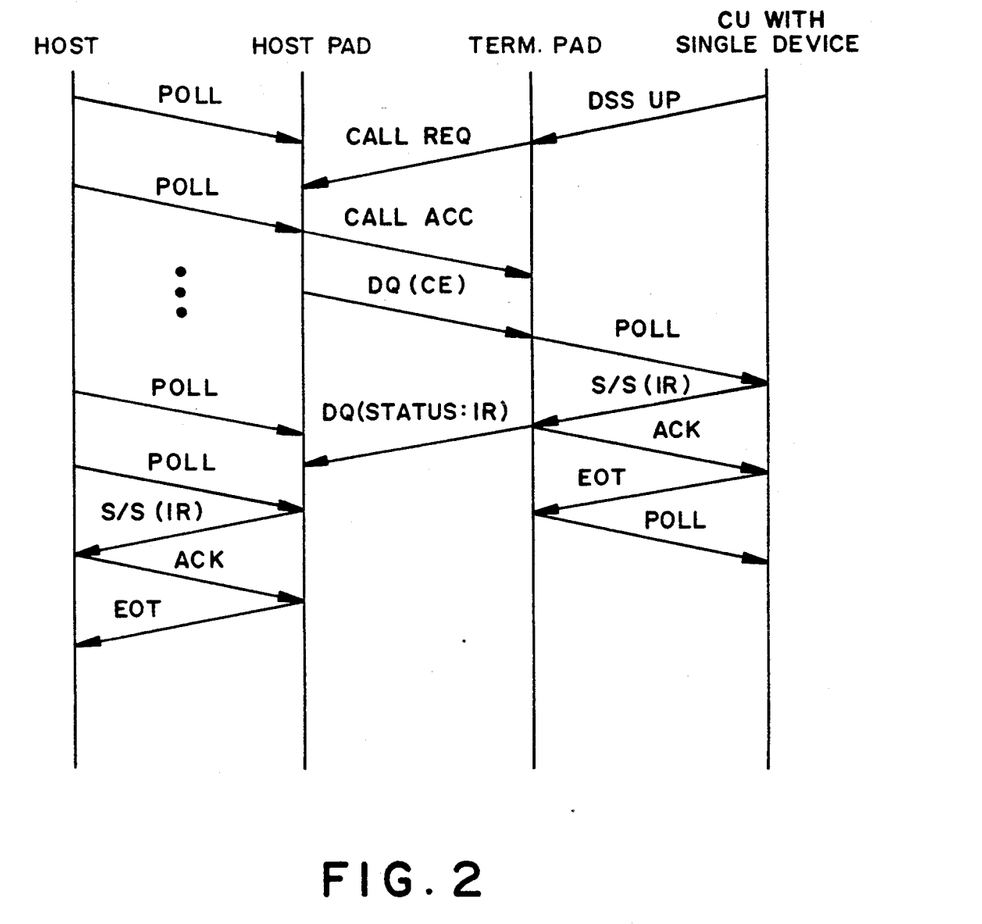

FIG. 2 is a sequence diagram illustrating the manner in which a VC is established for a single transparent connection device per CU configuration when the CU responds with an S/S message indicating the device is down. Here, the same sequence occurs as described above with respect to FIG. 1, except that in this instance the DQ (Status) packet forwarded through the Terminal PAD and the Host PAD to the Host indicates that the device is currently down.

Figure 3:
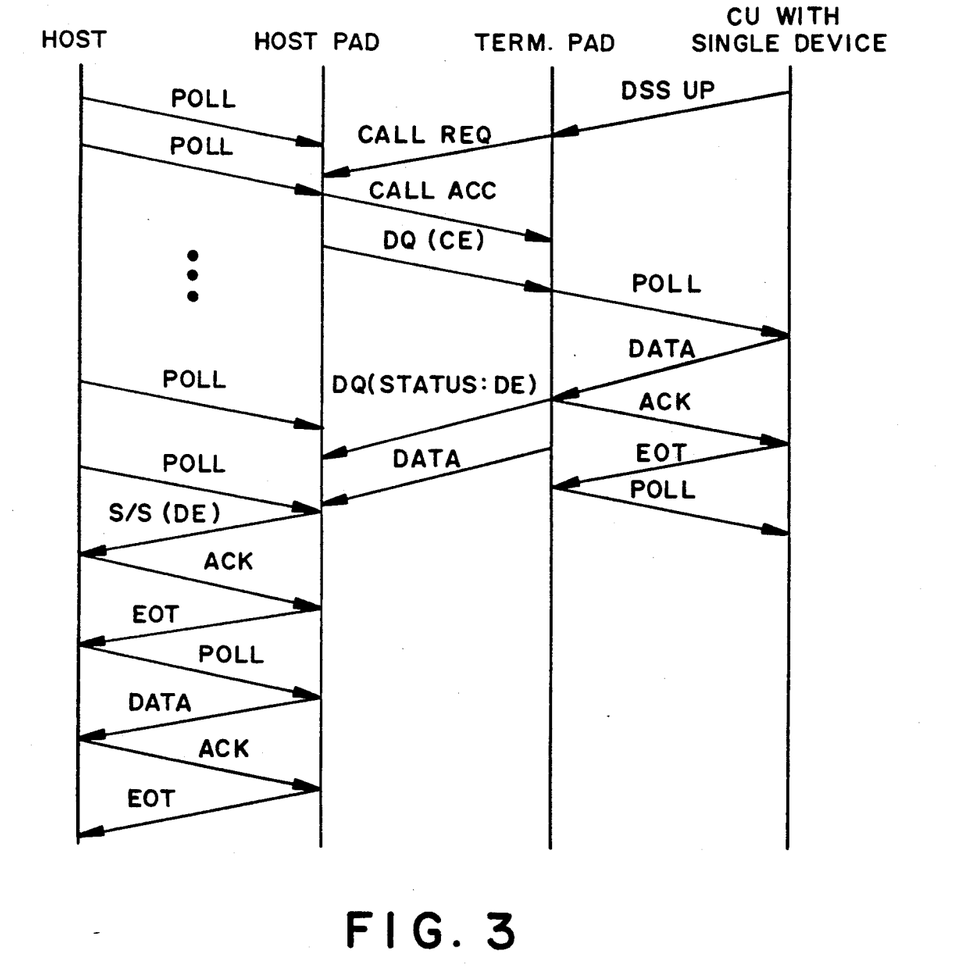

The situation in which the CU responds to the Terminal PAD poll with device data is depicted in the sequence diagram of FIG. 3. On receipt of the data, the Terminal PAD transmits a DQ (Status) packet including S/S with DE to the Host PAD, to indicate establishment of end-to-end communication. The Host PAD passes the S/S message to the Host to establish link-level communication therebetween. The Host and Terminal PADs transition to a normal data transfer state, and the Terminal PAD then commences transmitting the device data packets received from the CU to the Host PAD.

Figure 4:
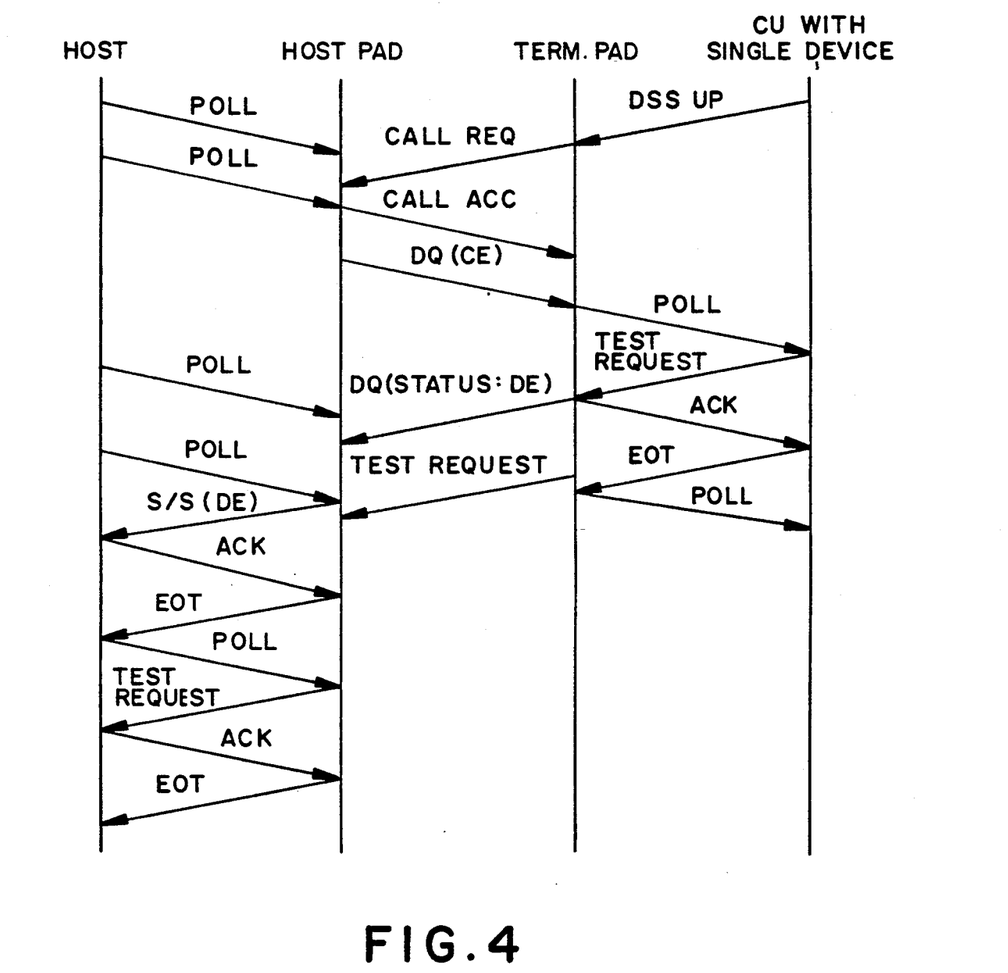

In the sequence diagram of FIG. 4, establishment of a virtual circuit as a result of the CU response with test request message is illustrated. Should the CU respond to the Terminal PAD poll with a test request message, on receipt of the message the Terminal PAD transmits a DQ (Status) packet with DE to indicate establishment of end-to-end communication, and follows with a Test Request packet to the Host PAD. The Host PAD passes the S/S message to the Host and link-level communication then takes place between the Host PAD and the Host, in which the Host PAD begins responding to the Host polls. The Host PAD thereafter transmits the test request message that was received from the Terminal PAD to the Host.

Figure 5:
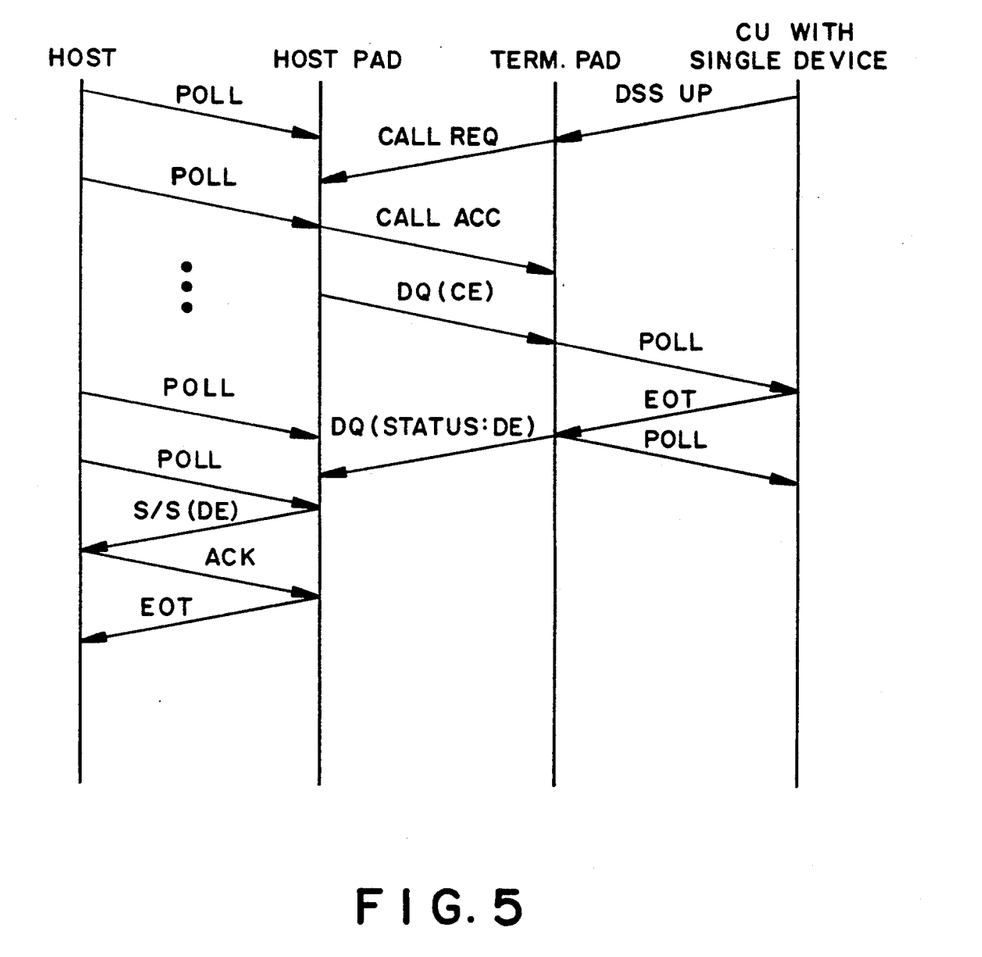

Another potential response by the CU and virtual circuit establishment therefor is illustrated in the sequence diagram of FIG. 5. Here, the CU responds with an end-of-transmission (EOT) message as the initial response to the Terminal PAD poll. On receipt of this response, the Terminal PAD transmits a DQ (Status) packet with DE to indicate that the device is up, and establishment of end-to-end communication with the Host PAD. The Host PAD passes the S/S message to the Host and link-level communication then takes place between the Host PAD and the Host, in which the Host PAD begins responding to the Host polls.

Figure 6:
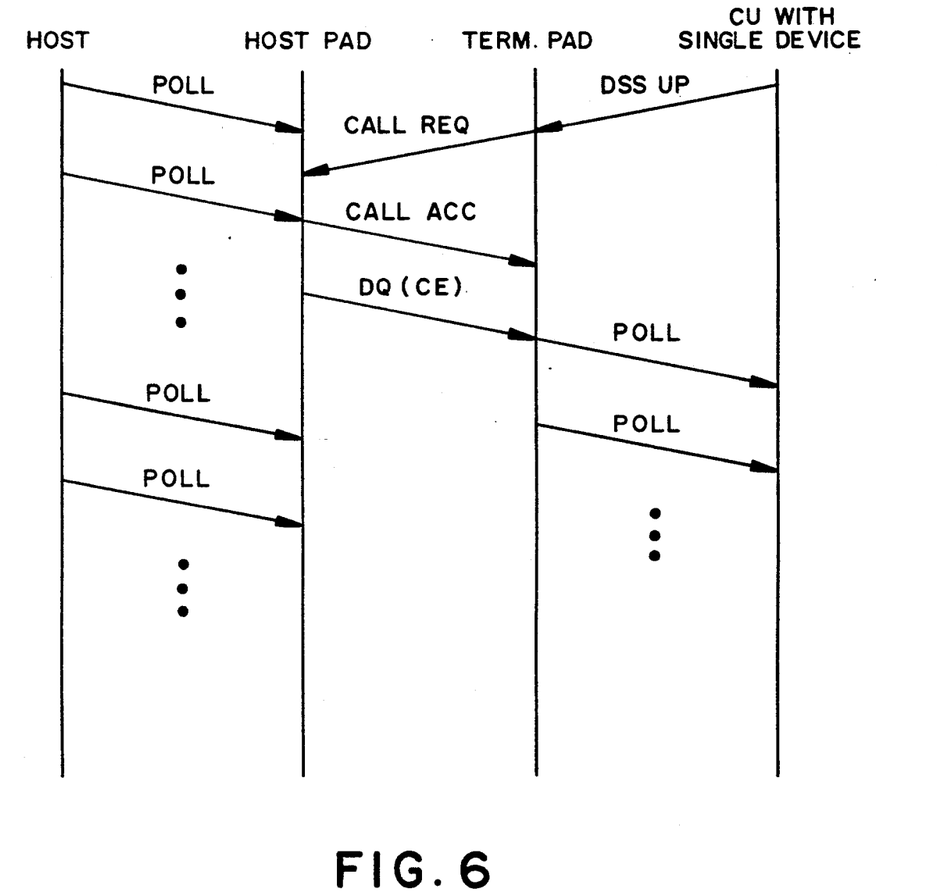

If the CU is not available when the Terminal PAD commences polling there will be no response from the CU, as illustrated in the sequence diagram of FIG. 6. The Terminal PAD continues polling the CU on each polling cycle, but no DQ (Status) packet is sent to the Host PAD by the Terminal PAD until the CU responds to the polls with a message. In the meantime, a VC is established and maintained until the configured (programmed) error retry limit is reached or the VC inactivity timer expires. Because no DQ (Status) packet is sent by the Terminal PAD to the Host PAD if there is no response by the CU to the polling, link-level communication between the Host PAD and the Host does not take place while that situation prevails.

If the CU contains multiple transparent connection devices, virtual circuits of such devices are established through the network automatically on detection of positive dataset signals on the associated line of the attached CU cluster, with additional dependence on the link-level communication capability between the Host PAD and the Host. After receiving Call Request packets for the multiple devices of the CU from the Terminal PAD and a subsequent poll from the Host, the Host PAD responds to the CR packets by transmitting Call Accept packets to the Terminal PAD to complete the establishment of the virtual circuit.

On establishing a VC for a CU transparent connection device in a CU cluster of multiple devices, the Host PAD sends a DQ (circuit enable) packet to the Terminal PAD for each device. All VCs for the multiple transparent connection devices of the CU cluster may not be established at the same time, because of network traffic and the status of destination Host(s). In that case, the Terminal PAD uses specific polls rather than general polls to poll the CU for messages from devices for which a VC has been established. (A general poll is a poll to the CU which can be used by the CU to respond for any device on the CU cluster, whereas a specific poll is a poll to a specific device on the CU cluster which can only be used to respond for that device). Finally, when every device in the CU cluster has a VC established, the Terminal PAD will revert to originating general polls again for the devices.

When a Circuit Enable packet is received by the Terminal PAD for a VC-established device, the Terminal PAD originates a specific poll to the CU cluster to obtain information from the corresponding device. A specific poll may or may not elicit a response from the CU, and, if a response is received, it may be any of several different types. The Terminal PAD generates a DQ (Status) packet containing S/S for the device which is appropriate to the specific response received, for transmission to the Host PAD via the network. The S/S message is then passed by the Host PAD to the Host. Link-level communication between Host PAD and Host commences when the first S/S message of any device on a CU cluster is passed to the Host, and end-to-end communication between the Host and the device(s) whose S/S message has been transmitted is then established.

As indicated above, the CU may provide any of several different responses to specific polls by the Terminal PAD, depending on the situation. The CU may generate the S/S message for the respective device in response to the poll, for transmission in the DQ (Status) packet by the Terminal PAD to the Host PAD which, in turn, passes the message to the Host. Link-level communication between Host PAD and Host takes place on passage of the first such S/S message, and end-to-end communication is then established with all devices whose S/S messages are transmitted.

Figure 7:
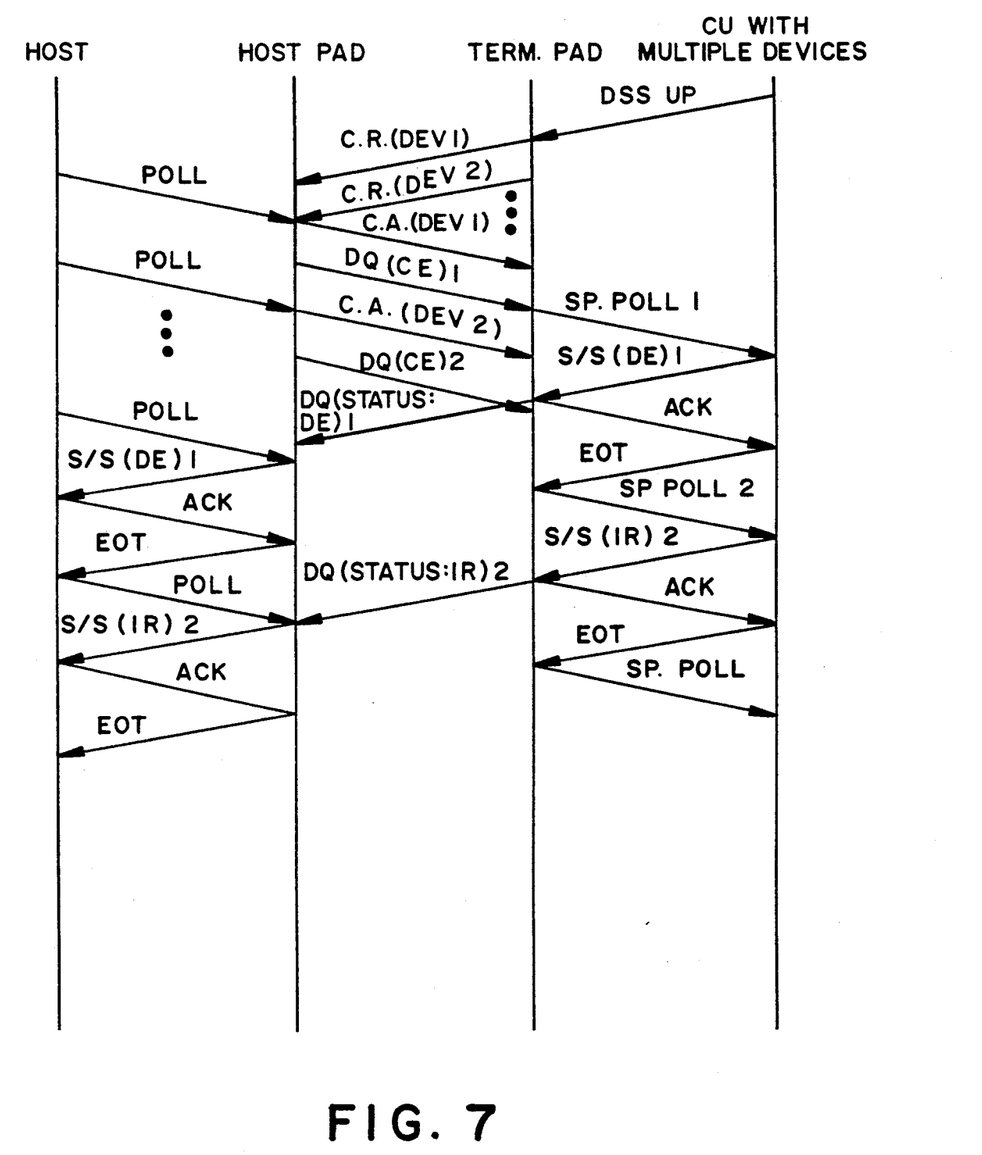

An example involving VC establishment for multiple transparent connection devices per CU configuration is illustrated in the sequence diagram of FIG. 7. Positive dataset signals are followed by transmission of CR packets for CU cluster Devices 1 and 2, for example, from the Terminal PAD. After a poll by the Host to the Host PAD subsequent to receipt of the Device 1 CR, a CA packet is transmitted by the Host PAD to the Terminal Pad through the network to establish a virtual circuit for Device 1. The Host PAD then sends a CE packet to the Terminal PAD, which is followed by a specific poll of Device 1 from the Terminal PAD. The CU responds with a Status message (S/S) indicating that Device 1 is up (DE without IR), which is transmitted as a DQ (Status) packet by the Terminal PAD to the Host PAD. A CA packet is also sent by the Host PAD to the Terminal PAD to establish a VC for Device 2 in response to the CR to the Host PAD (from the terminal PAD) from that device and a subsequent poll to the Host PAD from the Host. The CA packet is followed by a CE packet for Device 2.

The S/S message of Device 1 is acknowledged by the Terminal PAD at the same time that the corresponding DQ (Status) packet is sent to the Host PAD. On the next Host poll, the Host PAD transmits the Device 1 S/S message to the Host, at which point link-level communication is established between Host and Host PAD in which the latter responds to each poll by the former. The Host acknowledges, and end-to-end communication is established between the Host and Device 1 of the CU cluster. When an end of transmission (EOT) message is subsequently transmitted by Device 1 to the Terminal PAD, the latter generates a specific poll of Device 2. In the example of FIG. 7, Device 2 responds with an S/S message indicating that device is down (IR). A corresponding DQ (Status) packet for Device 2 is transmitted to the Host PAD from the Terminal PAD, and then passed on to the Host. This results in establishment of end-to-end communication between the Host and device 2. A general poll will be originated by the Terminal PAD to replace specific polls if and when VCs for all devices of the CU cluster are established.

Figure 8:
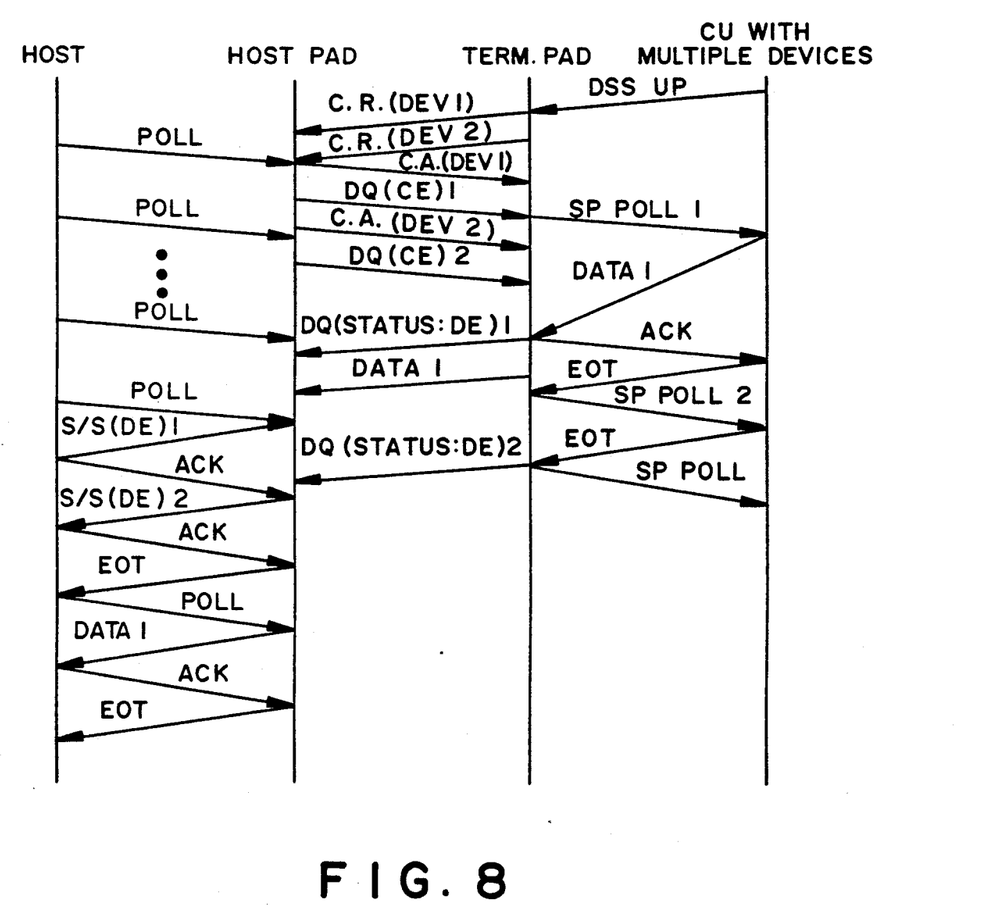

FIG. 8 is illustrative of another situation in which a multiple device CU cluster responds with device data to a specific poll from the Terminal PAD. As before, the VC is established and communication initiated with the sequence of CR, CA, and CE packets following appropriate polling. On receipt of the Device 1 data, the Terminal PAD first transmits a DQ (Status) packet (S/S with DE, indicating the device is up in this example) for Device 1 to the Host PAD to initiate establishment of end-to-end communication between the Host and Device 1. The Terminal PAD then transmits the data to the Host PAD and enters the data transfer state.

Figure 9:
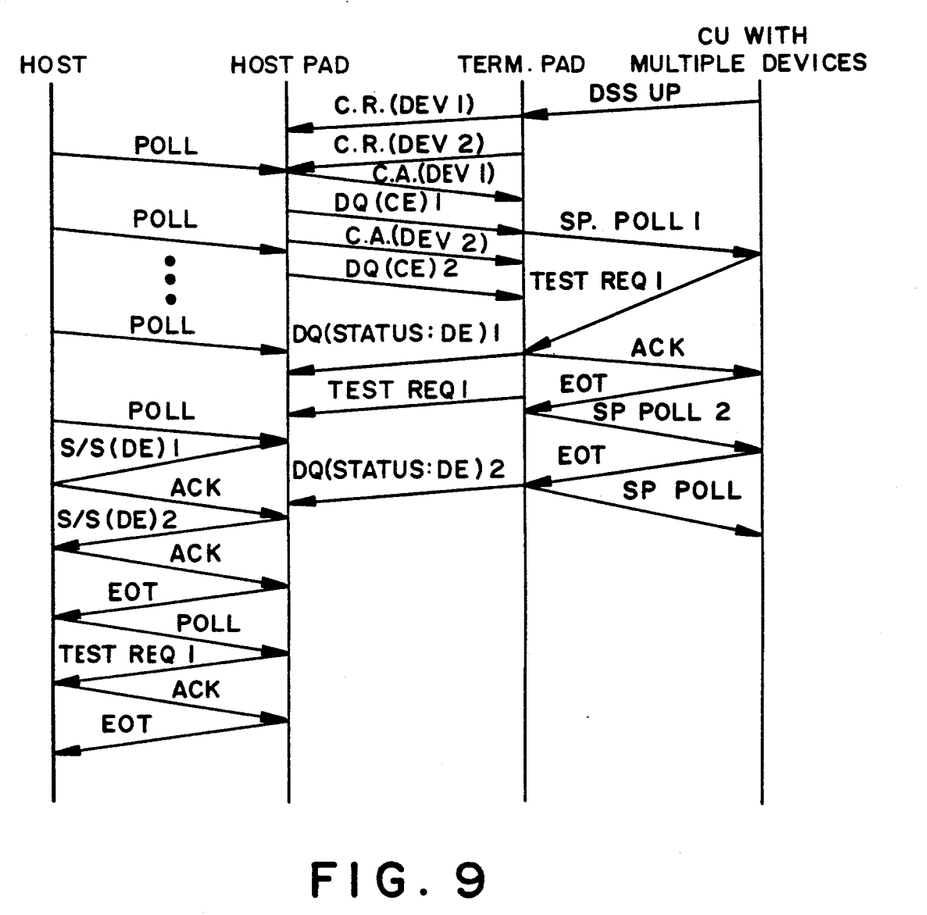

In the sequence diagram of FIG. 9, the CU cluster responds with a test request message of Device 1 to the specific poll by the Terminal PAD. Upon receipt of the test request, the Terminal PAD transmits a DQ (Status) packet (S/S with DE) to the Host PAD, and a corresponding message is then transmitted to the Host to establish link-level and then end-to-end communication. The Terminal PAD then transmits the test request packet for Device 1 to the Host PAD.

Figure 10:
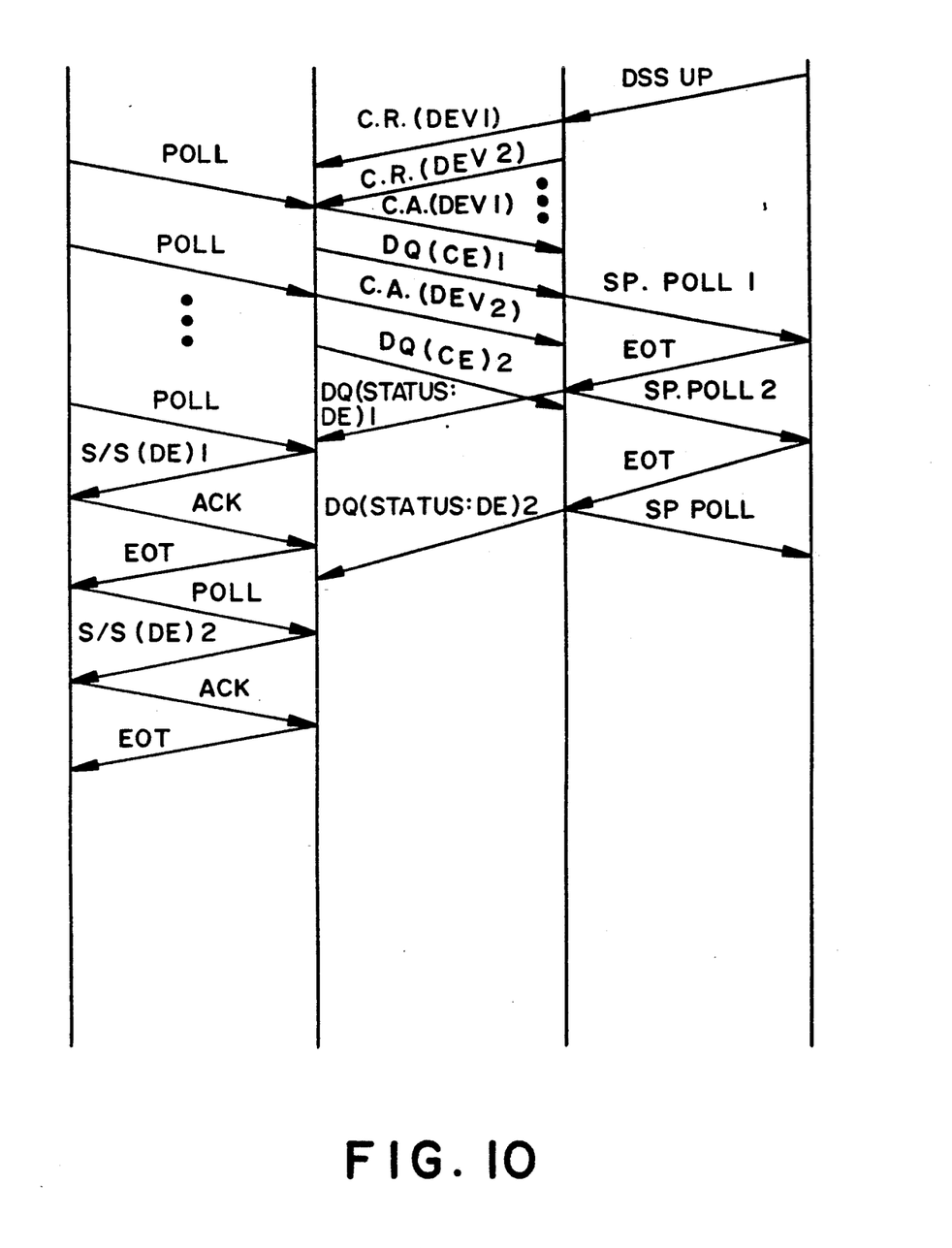
Figure 11:
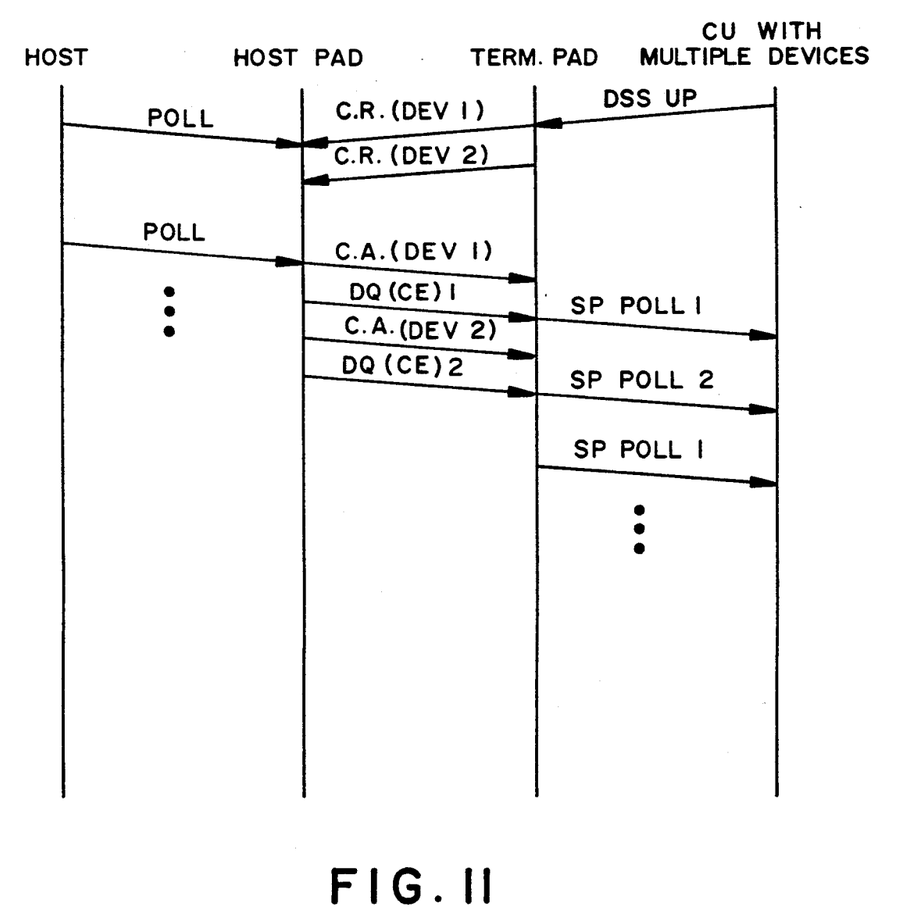

The sequence diagrams of FIGS. 10 and 11 are examples of CU responses to specific polls with EOT message and no response, respectively.

By way of further explanation of the data transfer state, the Terminal PAD utilizes specific polls to obtain messages of one VC-established device from a CU cluster on each polling cycle. These messages are then transmitted to the Host PAD, and ultimately forwarded to the Host processor. If any VCs on the CU cluster are cleared once VCs of all devices on the CU cluster are established, the Terminal PAD will return from general polling to the specific polling process. Only one device whose VC has been established, among the multiple devices of the CU cluster, is polled during each cycle of specific polling. For purposes of the preferred embodiment and process of the invention involving CU clusters with multiple transparent connection devices, a polling cycle is defined as the completion of the Terminal PAD polling from the first to the last CU on a 3270 communication line. Thus, for example, if two devices on a CU are VC-established, two polling cycles would be required for the Terminal PAD to poll those two devices (once on each device).

If a BSC 3270 communication line configuration contains two CUs on the line, in which CU1 contains three transparent connection devices with VCs established for Devices 1 and 2 only, and CU2 contains non-transparent connection devices, the polling sequence is as follows. In polling cycle 1, there is a specific poll of Device 1 of CU1, and a general poll of CU2. In polling cycle 2, there is a specific poll of Device 2 of CU1, and a general poll of CU2. Subsequent polling cycles then simply repeat polling cycles 1 and 2 in that sequence.

Non-transparent connection devices on a mixed CU cluster (i.e., a single CU cluster containing both transparent and non-transparent connection devices, which, as was stated earlier herein, is not recommended), are not polled until VCs have been established for all transparent connection devices on the CU. For a single transparent connection device mixed CU cluster, general polls are used by the terminal PAD to obtain messages from the CU cluster during the data transfer state.

Figure 12:
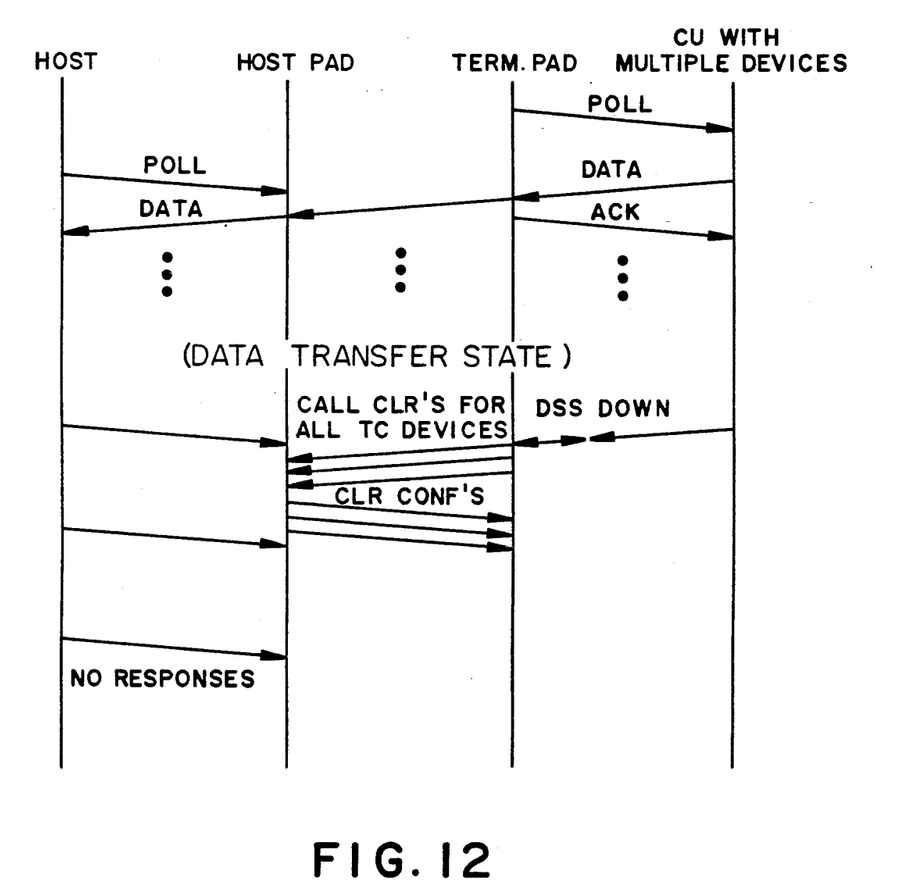
Figure 13:
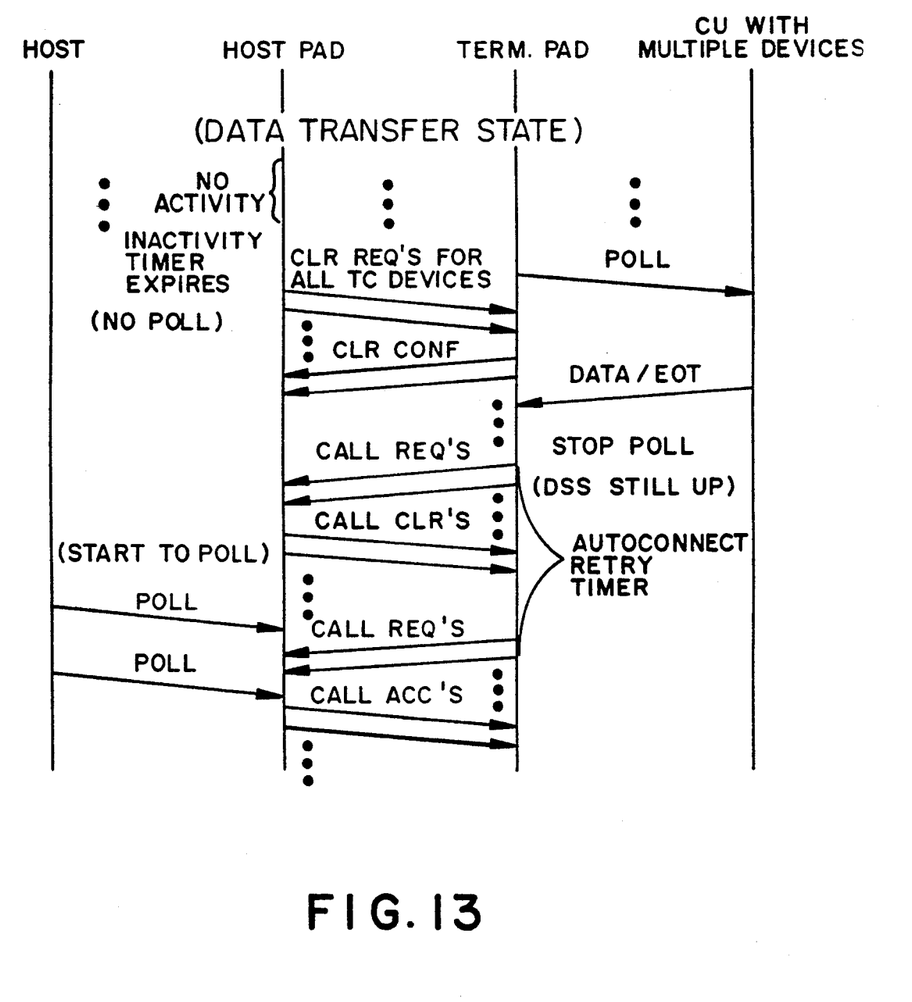

Virtual circuit disconnection for transparent connection devices of CU clusters with multiple devices is illustrated in each of the sequence diagrams of FIGS. 12 and 13. If a configured error retry limit is reached or the virtual circuit inactivity timer expires, the terminal PAD initiates disconnection of the respective VC. The Terminal PAD will, however, attempt to re-establish the circuit if positive dataset signals remain present. If all of the transparent connection devices of the CU cluster have their VCs disconnected, the terminal PAD discontinues polling of the CU. In the case of a mixed CU cluster, this also affects non-transparent connection devices on the cluster, in that they are not polled until all of the transparent connection devices VCs have been established. The VCs of the non-transparent devices are cleared upon expiration of the VC inactivity timer.

In FIG. 12, the Terminal PAD originates a clear for all transparent connection devices of the CU when the positive dataset signals (DSS) are dropped, following the data transfer state. In FIG. 13, the Host PAD originates the clear when the VC inactivity timer expires.

Although a presently preferred embodiment and process of the invention have been described, it will be apparent to those skilled in the art to which the invention pertains from a consideration of the foregoing disclosure that variations and modifications may be effected without departing from the true spirit and scope of the invention. Accordingly, it is intended that the invention shall be limited only as and to the extent required by the appended claims and the applicable rules and principles of law.

What is claimed is:

1. A method for establishing an end-to-end virtual circuit connection in a packet switched network for data packet communication between a host computer operatively associated with a host packet assembler/disassembler (PAD) and any of a plurality of user devices operatively associated with a terminal PAD, in a 3270 protocol system wherein the transmission of a call request packet from a user device through the network on system start up is normally required to be preceded by an initial polling of the host PAD by the host computer and local polling of the user devices by the terminal PAD, the method comprising:

transmitting a signal from any of the user devices ready to transmit, to the terminal PAD to indicate that the user device which transmitted the signal desires to establish a call connection for a communication session with the host computer, upon receipt of the signal at the terminal PAD, transmitting a call request (CR) packet from the terminal PAD through the network without the user device which transmitted the signal first having been locally polled by the terminal PAD, and at the host PAD, responding to the CR packet when the host computer polls the host PAD, by acknowledgement to the terminal PAD to initiate establishment of a virtual circuit (VC) through the network for an end-to-end communication session between the user device which transmitted the signal and the host computer.

2. The method of claim 1, wherein the step of responding to the call request packet at the host PAD after the polling by the host computer includes:

transmitting call accept (CA) and circuit enable (CE) packets through the network to the terminal PAD for establishing the VC.

3. The method of claim 2, further including:

at the terminal PAD, responding to receipt of the CE packet as though it were a poll from the host computer, by initiating local polling of the user devices associated therewith.

4. The method of claim 3, further including:

at each locally polled user device, responding to the local polling from the terminal PAD as though it were an end-to-end poll, by generating a message indicative of the status of the respective device then being polled, as to whether that device is operating or non-operating.

5. The method of claim 4, further including:

at the terminal PAD, responding to the status message from each polled user device by transmitting a corresponding packet to the host PAD indicative of the status of the respective user device, and at the host computer, accepting each status-indicative packet received at the host PAD as though such status-indicative packet were an end-to-end response from the respective user device that generated the status message.

6. The method of claim 5, wherein:

the recited sequence of steps at the user devices, the terminal PAD, the host PAD and the host computer is performed only on start-up of the 3270 protocol system for the terminal PAD to establish a VC, and thereafter performing only local polling by the host computer of the host PAD, and local polling by the terminal PAD of the user devices, so long as the VC remains established.

7. The method of claim 6, further including:

at the terminal PAD after start-up, continuing to locally poll only those user devices for which a VC is established with the host computer to initiate data transfer by those user devices with the host computer.

8. The method of claim 7, further including:

commencing general polling by the terminal PAD of all user devices operatively associated with the terminal PAD for which a VC has been established with the host computer.

9. The method of claim 8, further including:

at the terminal PAD, when any VC is cleared, resuming local polling of only those user devices operatively associated with the terminal PAD for which a VC remains established with the host computer.

10. The method of claim 6, further including:

at the host computer and the terminal PAD, after establishment of a VC as a call connection for end-to-end communication between the host computer and the respective user device for that VC, when data transfer is requested by the host computer, performing local polling of the host PAD and that user device, respectively, to initiate transfer of data at the host computer from and to that user device.

11. The method of claim 6, further including:

at any user device which suffers failure of a VC after start-up of the 3270 protocol system, re-initiating the VC to re-establish the communication session between the host computer and that user device, by again signalling the terminal PAD without local polling of that user device by the terminal PAD.

12. In apparatus for establishing an end-to-end virtual circuit connection in a packet switched network for data packet communication between a host computer operatively associated with a host packet assembler/-disassembler (PAD) and any of a plurality of user devices operatively associated with a terminal PAD, of a 3270 protocol system wherein the transmission of a call request (CR) packet from a user device through the network on system start up is normally required to be preceded by an initial polling of the host PAD by the host computer and local polling of the user devices by the terminal PAD, the improvement comprising:

user device means for transmitting a signal to the terminal PAD from any of the user devices ready to transmit, to indicate that the user device means which transmitted the signal desires to establish a call connection for a communication session with the host computer, terminal PAD means responsive to receipt of the signal from the user device means at the terminal PAD for transmitting a CR packet from the terminal PAD through the network without the user device means which transmitted the signal first having been locally polled by the terminal PAD, and host PAD means responsive to the host computer polling the host PAD after receipt of the CR packet at the host PAD, for transmitting a call accept (CA) packet to the terminal PAD to initiate establishment of a virtual circuit (VC) through the network for an end-to-end communication session between the user device means which transmitted the signal and the host computer.

13. The improvement of claim 12, wherein:

said user device means transmits the signal from any of the user devices ready to transmit, only upon system start up, and said terminal PAD means is further responsive to receipt of the CA packet for thereafter performing only local polling of the user devices while the VC remains established.

* * * * *